United States Patent [19]

Gharadjedaghi et al.

[11] 4,207,671
[45] Jun. 17, 1980

[54] METHOD OF MANUFACTURE OF A PASSIVE ELECTRO-OPTIC DISPLAY CELL HAVING AN HELICOIDAL NEMATIC LIQUID CRYSTAL AND PASSIVE ELECTRO-OPTIC DISPLAY CELL OBTAINED BY CARRYING OUT THIS METHOD

[75] Inventors: Fereydoun Gharadjedaghi, Neuchatel; Yves Ruedin, Saint-Blaise; René Viennet, Neuchatel, all of Switzerland

[73] Assignee: Ebauches, S.A., Switzerland

[21] Appl. No.: 869,581

[22] Filed: Jan. 16, 1978

[30] Foreign Application Priority Data

Jan. 21, 1977 [CH] Switzerland ............... 716/77

[51] Int. Cl.² .............................................. G02F 1/13
[52] U.S. Cl. .................................. 29/592 R; 350/341
[58] Field of Search ............ 29/592 R; 350/340, 341; 428/1

[56] References Cited

U.S. PATENT DOCUMENTS

| | | | |
|---|---|---|---|
| 3,700,306 | 10/1972 | Cartmell et al. | 350/341 |
| 3,834,792 | 9/1974 | Janning | 29/592 R |
| 3,853,391 | 12/1974 | Sorkin | 350/341 |
| 3,930,716 | 1/1976 | Robert | 428/1 |
| 3,955,881 | 5/1976 | Yaguchi et al. | 350/341 |
| 3,963,324 | 6/1976 | Fergason et al. | 350/341 |
| 3,966,305 | 6/1976 | Young | 350/341 |
| 3,967,883 | 7/1976 | Meyerhofer et al. | 350/341 |
| 4,083,099 | 4/1978 | Yano et al. | 29/592 R |
| 4,084,884 | 4/1978 | Ragnes | 350/341 X |

FOREIGN PATENT DOCUMENTS 2268277 2/1975 France ........................ 350/341

*Primary Examiner*—Milton S. Mehr
*Attorney, Agent, or Firm*—Silverman, Cass & Singer, Ltd.

[57] ABSTRACT

A liquid crystal alignment film is deposited on the inner surfaces of two plates of an electro-optic passive display cell. The film is vacuum evaporated on the plates at an incidence of 5° and at least one plate is rubbed in only the direction of deposition. A helicoidal nematic liquid crystal is disposed between the two plates of the cell, and is aligned by the film.

6 Claims, 2 Drawing Figures

METHOD OF MANUFACTURE OF A PASSIVE ELECTRO-OPTIC DISPLAY CELL HAVING AN HELICOIDAL NEMATIC LIQUID CRYSTAL AND PASSIVE ELECTRO-OPTIC DISPLAY CELL OBTAINED BY CARRYING OUT THIS METHOD

BACKGROUND OF THE INVENTION

The present invention relates to a method of manufacturing of a passive electro-optic display cell having a helicoidal nematic liquid crystal and two plates, between which is disposed the said crystal. According to this method one effects the deposition of an alignment film on the inner face of each of said plates by evaporation with vacuum under an incidence ensuring an alignment of the molecules of the liquid crystal. The liquid crystal thus becomes orientated along a direction determined by the process of evaporation.

It is to be noted that an alignment film is a thin layer of a material able to orientate the molecules of a liquid crystal when the liquid crystal is placed on said layer. By way of example, such a film can be silicon oxide, $SiO_x$ ($1 < X < 2$), magnesium fluoride, $MgF_2$, platinum, chromium, etc. (cf. U.S. Pat. Nos. 3,834,792 and 3,853,391).

The invention has also for an object a passive electro-optic display cell obtained by carrying out this method.

It is known that the substrate of passive electro-optic display cells with nematic liquid crystals must be treated so that an alignment of the molecules of the crystal is realized. Several techniques permitting such an alignment are commonly used.

The first of these techniques consists in rubbing, along a given direction, by means of a rag, the surface of the substrate which will enter into contact with the liquid crystal. The molecules of the liquid crystal which are in the vicinity of the substrate will then be aligned along the direction of the rubbing after the cell is filled. As a matter of fact, once they are orientated, these molecules make an angle of 2° to 3° with respect to the surface of the substrate.

This rubbing technique has the drawback of not being usable in cells the frame of which is made of sintered glass, the properties of alignment of the treated surface formed this way disappearing during the heating of the cell to form the sintered glass. Moreover, the anchoring is relatively weak and an aging occurs which is such that the life of the cell can be jeopardized.

Another technique of orientation of alignment of the molecules of the liquid crystal is by depositing an alignment film, for instance a layer of silicon oxide ($SiO_x$), under an incidence or angle of the order of 5°. In this case, the projection on the substrate of the direction of alignment of the molecules which are in the vicinity of the substrate coincides with the direction of incidence of the $SiO_x$, these molecules making then an angle of 15° to 30° with respect to the substrate.

In this case, one ascertains that the contrast of the display as a function of the field applied to the cell varies progressively from a zero field, which can be a drawback for some applications, such as in multiplexed cells.

One can also make the deposition of the layer of $SiO_x$ under an incidence of the order of 30°. In this case molecules of the liquid crystal in the vicinity of the substrate align themselves perpendicular to the direction of the incidence and are, on the average, parallel to the substrate.

In this case, one ascertains that domains (the term being used in the sense it has in crystallography) are formed during the application to the cell of a field higher than a threshold value. These domains are due to the fact that, the molecules being initially parallel to the basis plate, the movement of the molecules can be effected in two opposed directions. Under these conditions, one sees that zones appear which present different optic behaviors, jeopardizing the aesthetic appearance of the cell. It remains that, for some applications, such as in multiplexing for instance, the presence of a threshold is desirable. That would lead then to adopting the solution of the deposition of $SiO_x$ under an incidence of 30°, the aesthetic appearance of which is unfortunately not satisfying.

The purpose of the present invention is to remove these drawbacks.

SUMMARY OF THE INVENTION

To this effect, the method of manufacture of a passive electro-optic display cell having an helicoidal nematic liquid crystal according to the invention is characterized by the fact that one rubs in only one sense the alignment film of at least one of the plates parallel to the projection on the plate, of the direction of alignment defined by the process of evaporation, the molecules of the liquid crystal which are in the vicinity of said plate then becoming orientated along a direction making an angle lower than 50°, but not zero, with the plate.

BRIEF DESCRIPTION OF THE DRAWING

The drawing shows, by way of example, two embodiments of the object of the invention.

DESCRIPTION OF THE PREFERRED EMBODIMENT

Figure 1:
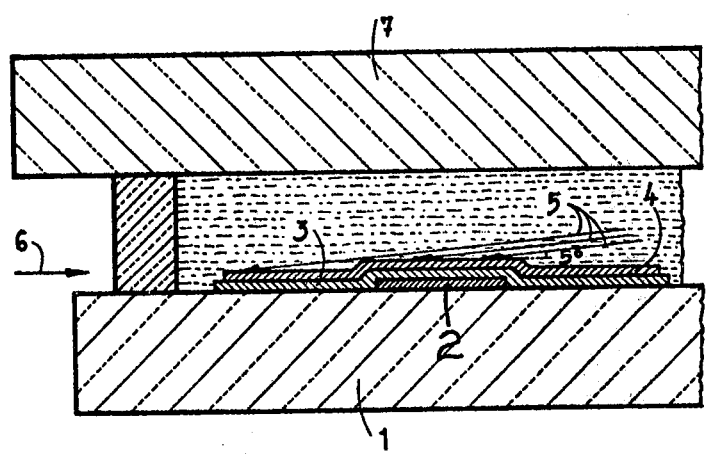
FIGS. 1 and 2 are sectional views each of a portion of a passive electro-optic display cell in the course of manufacture.

In the case of FIG. 1, comprising a glass plate 1 constituting the substrate of the cell, and which is provided with a conductive track 2 constituting an electrode, one applies, by evaporation under vacuum, a layer 3 of silicon dioxide ($SiO_2$), of a thickness of 2000 Å, for instance, insulating the electrode 2 from the liquid crystal, which eliminates the electrolysis of the crystal. One applies then on the layer of $SiO_2$, by evaporation under a vacuum of $2 \cdot 10^{-6}$ Torr, for instance, a layer 4 of silicon oxide, of a thickness of 300 Å, under a grazing incidence or angle of 5° as indicated by the arrows 5 of the drawing.

One rubs then by means of a rag, for instance five times, always in the same sense or direction, the face of the glass plate 1 which is coated with silicon oxide, along the direction indicated by the arrow 6 of FIG. 1, that is to say parallel to the direction of alignment defined by the process of evaporation of the silicon oxide. One will use to this effect, for instance, a rag sold under the Trademark "TEXWIPE" which is manfactured by the firm TEXWIPE, in Hillsdale, N.J., U.S.A.

It is to be noted that the first part of the treatment, that is to say the application of a layer of silicon oxide under a grazing incidence, must also be applied to the second plate of the cell, designated by 7. However, one can omit the operation of rubbing so long as the silicon oxide is applied on the second plate in oblique incidence, that is to say under an angle of the order of 30°.

After the filling of the cell with the nematic liquid crystal, the molecules of this crystal which are in the vicinity of the plate 1 become consequently aligned or orientated along a direction which makes a non zero angle lower than 5°, for instance of 3°, with the plate. The properties of alignment of the rubbed layer of silicon oxide are not altered by the increase of temperature which is needed to seal the cell by means of sintered glass.

Figure 2:
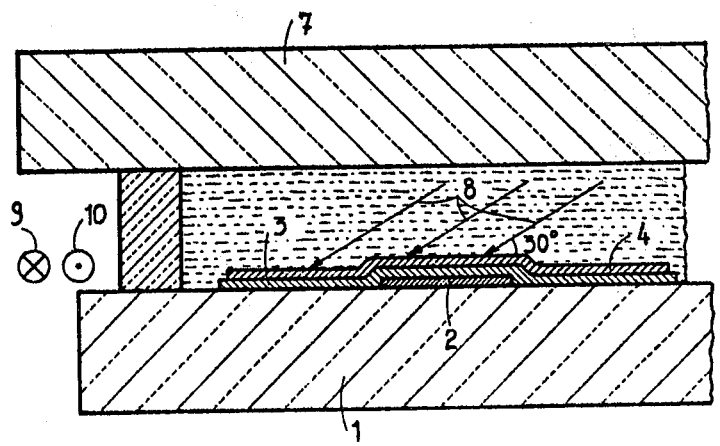

The mode of carrying into effect the method illustrated in FIG. 2 distinguishes from the method shown in FIG. 1 by the fact that the layer of silicon oxide is deposited by evaporation under vacuum under an incidence which is not "grazing" as in the case of FIG. 1, but "oblique", of the order of 30°, as indicated by the arrows 8. For the rest of the method, the treatment is the same as disclosed previously, with the difference, however, that the layer of silicon oxide under an oblique incidence has for an effect that the molecules of the liquid crystal are aligned along a direction perpendicular to the direction of evaporation. The rubbing must be effected perpendicularly to the direction of evaporation in one or the other of the senses or directions indicated by the symbols 9 and 10 of FIG. 2.

The second plate, 7, of the cell will also be provided with silicon oxide deposited under oblique incidence, with or without rubbing.

After the filling of the cell, the molecules of the liquid crystal which are in the vicinity of the plate 1 make an angle which is not zero, but lower than 5°, with respect to the plane of the cell. When one applies an electric field to the electrodes, one ascertains on the one hand the existence of an electro-optic threshold marked sufficiently, and on the other hand a uniform orientation of the molecules of the liquid crystal in the whole plane parallel to the plate in the activated areas.

One ascertains, according to the two preceding examples that the alignment film has effects which are different according to the incidence under which it is applied. In the first case hereabove explained, where the incidence is low, called grazing, the direction of alignment of the molecules coincides with the direction of incidence of the evaporation. In the second case, where the incidence is greater, called oblique, the molecules of the liquid crystal are aligned perpendicular to the direction of incidence and are parallel to the plate of the substrate.

Consequently, there is transition zone of incidences, during which is effected the passage from the first to the second case, which varies according to the material of alignment selected, and which is of the order of 15° to 20° for silicon oxide. Obviously, it is preferable not to choose an incidence which falls in this zone for the application of the alignment film since, for this zone, the alignment of the molecules is badly defined.

It is to be noted that the present display cells are particularly suitable for the multiplexing.

We claim:

1. Method of manufacturing an electro-optic passive display cell including a helicoidal nematic liquid crystal disposed between two juxtaposed plates, said method comprising the steps of
depositing an alignment film on an inner face of each of the two plates by vacuum evaporating the film material at an incidence of approximately 5° with respect to the plane of the plates, the deposited film having a direction of alignment on the plates which is the same as the direction of evaporation of the film projected on the plates, and rubbing the film deposited on at least one plate in one direction only, which direction is parallel to the direction of alignment of the film, whereby the molecules of the liquid crystal are oriented at an angle greater than 0° but less than 5° with respect to the plane of the plates.

2. Method as claimed in claim 1, wherein the alignment film is silicon oxide, $SiO_x$ ($1 < X < 2$).

3. Method as claimed in claim 1, wherein the alignment film is magnesium floride, $MgF_2$.

4. Method as claimed in claim 1, wherein the alignment film is platinium, Pt.

5. Method as claimed in claim 1, wherein the alignment film is chromium, Cr.

6. Method as claimed in claim 1, wherein the rubbing step is performed on the alignment film of each of the two plates.

* * * * *